(12) United States Patent
Chen (10) Patent No.: US 11,170,675 B2
(45) Date of Patent: Nov. 9, 2021

(54) METHOD FOR PERFORMING HYBRID OVER-CURRENT PROTECTION DETECTION IN A DISPLAY MODULE, AND ASSOCIATED TIMING CONTROLLER

(71) Applicant: HIMAX TECHNOLOGIES LIMITED, Tainan (TW)

(72) Inventor: Ching-Lun Chen, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 14 days.

(21) Appl. No.: 16/824,650

(22) Filed: Mar. 19, 2020

(65) Prior Publication Data

US 2021/0295752 A1    Sep. 23, 2021

(51) Int. Cl.
*G09G 3/00* (2006.01)
*G09G 3/36* (2006.01)

(52) U.S. Cl.
CPC ........... *G09G 3/006* (2013.01); *G09G 3/3696* (2013.01); *G09G 2310/08* (2013.01); *G09G 2330/04* (2013.01); *G09G 2330/12* (2013.01)

(58) Field of Classification Search
CPC ....................................................... G09G 3/006
See application file for complete search history.

(56) References Cited

U.S. PATENT DOCUMENTS

2015/0172590 A1\* 6/2015 Wang ..................... G09G 5/393
345/545
2019/0278114 A1\* 9/2019 Lee ......................... G09G 3/006

\* cited by examiner

*Primary Examiner* — Gustavo Polo
(74) *Attorney, Agent, or Firm* — Winston Hsu (57) ABSTRACT

A method for performing hybrid over-current protection (OCP) detection in a display module and associated timing controller are provided. The method includes: during initialization of the display module, after a set of driving voltages have been established, performing first OCP detection in a built-in self-test (BIST) mode to generate a first OCP detection result; writing the first OCP detection result into a register bank, for being accessed by a host device, wherein the display module is applicable to displaying information for the host device; performing second OCP detection in a normal mode to generate a second OCP detection result; and writing the second OCP detection result into the register bank, for being accessed by the host device.

14 Claims, 8 Drawing Sheets

METHOD FOR PERFORMING HYBRID OVER-CURRENT PROTECTION DETECTION IN A DISPLAY MODULE, AND ASSOCIATED TIMING CONTROLLER

BACKGROUND OF THE INVENTION

1. Field of the Invention

The present invention relates to fail detection, and more particularly, to a method for performing hybrid over-current protection (OCP) detection in a display module and an associated timing controller.

2. Description of the Prior Art

Built-in display devices such as liquid crystal display (LCD) panels have been widely used in automotive vehicles such as cars, buses, etc. According to the related art, a display device of a host system in a car may notify the host system of an error by changing (e.g. pulling up) a voltage level of a certain signal. However, some problems may occur. For example, when one or more signals input into the display device are erroneous (e.g. the pixel clock may be too fast), the display device may display abnormally, and more particularly, may consume a large current, causing an over-current protection (OCP) fail to be triggered. As a result, there may be misjudgment regarding whether the display side or the host side malfunctions. Hence, there is a need for a novel method and associated architecture to enhance fail detection mechanism without introducing a side effect or in a way that is less likely to introduce a side effect.

SUMMARY OF THE INVENTION

It is therefore an objective of the present invention to provide a method for performing hybrid over-current protection (OCP) detection in a display module, and to provide an associated timing controller, in order to solve the above-mentioned problems.

It is another objective of the present invention to provide a method for performing hybrid OCP detection in a display module, and to provide an associated timing controller, in order to enhance fail detection mechanism without introducing a side effect or in a way that less likely to introduce a side effect.

At least one embodiment of the present invention provides a method for performing hybrid OCP detection in a display module. The method may comprise: during initialization of the display module, after a set of driving voltages have been established, performing first OCP detection in a built-in self-test (BIST) mode to generate a first OCP detection result; writing the first OCP detection result into a register bank, for being accessed by a host device, wherein the display module is applicable to displaying information for the host device; performing second OCP detection in a normal mode to generate a second OCP detection result; and writing the second OCP detection result into the register bank, for being accessed by the host device.

In addition to the above method, the present invention also provides a timing controller, where the timing controller is applicable to performing hybrid OCP detection in a display module. The timing controller may comprise a communications port, a register bank that is coupled to the communications port, and a first OCP detection circuit and a second OCP detection circuit that are coupled to the register bank. For example, the communications port may be arranged to perform communications with a host device for the timing controller, and the register bank may be arranged to store information for the timing controller. During initialization of the display module, after a set of driving voltages have been established, the first OCP detection circuit may perform first OCP detection in a BIST mode to generate a first OCP detection result, and write the first OCP detection result into the register bank, for being accessed by the host device, wherein the display module is applicable to displaying information for the host device. In addition, the second OCP detection circuit may perform second OCP detection in a normal mode to generate a second OCP detection result, and write the second OCP detection result into the register bank, for being accessed by the host device.

The present invention method and associated apparatus (e.g. the timing controller) can guarantee that sufficient information for correct judgment regarding whether the display side or the host side malfunctions is available. In addition, implementing the embodiments of the present invention does not significantly increase additional costs. Therefore, the related art problems can be solved, and the overall cost will not increase too much. In comparison with the related art, the present invention method and associated apparatus can enhance fail detection mechanism without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
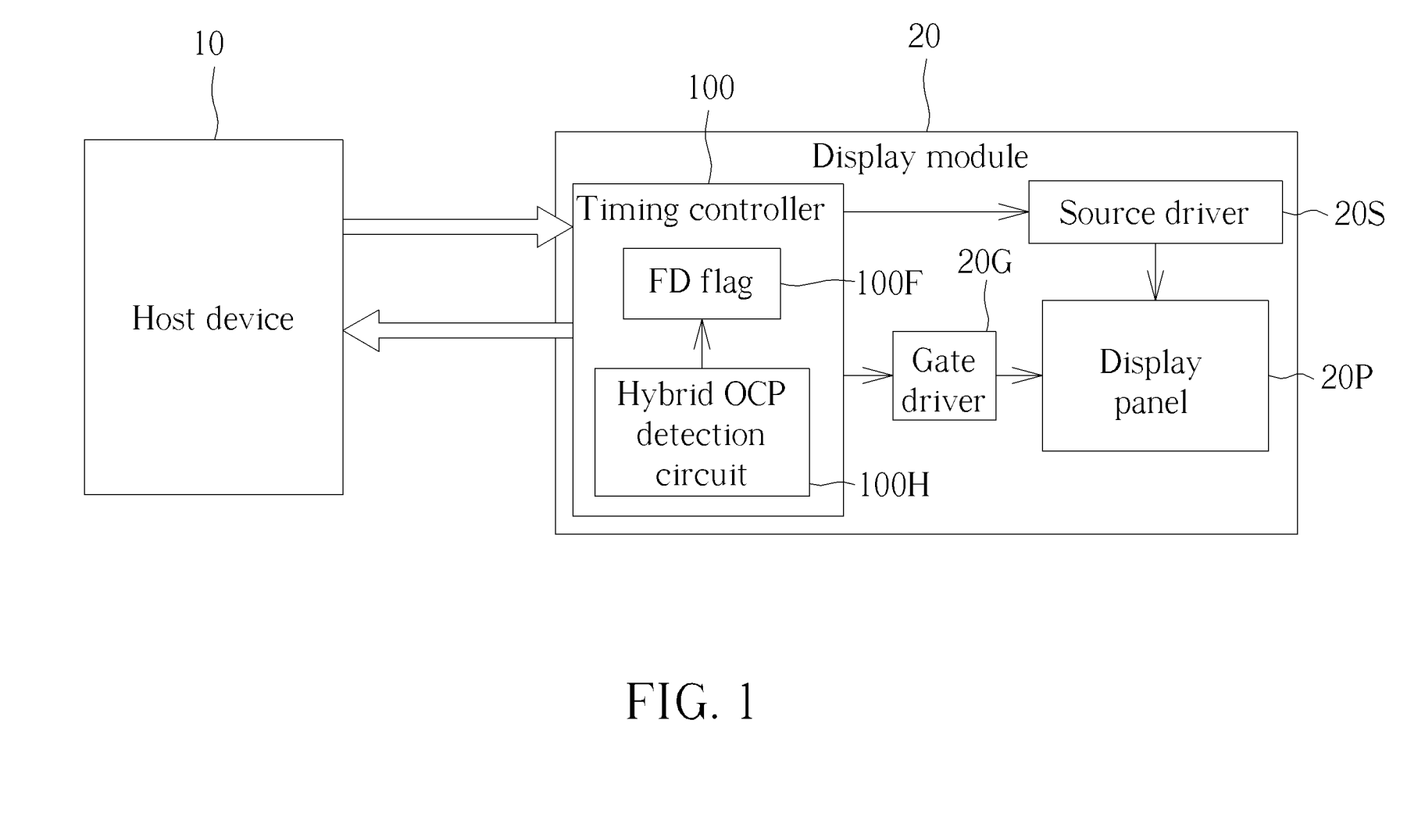
FIG. 1 is a diagram of a host system according to an embodiment of the present invention, where the host system may comprise a host device and a display module.

FIG. 1 is a diagram of a host system according to an embodiment of the present invention, where the host system may comprise a host device 10 and a display module 20, and the display module 20 may comprise a timing controller 100, at least one source driver (e.g. one or more source drivers) which may be collectively referred to as the source driver 20S, at least one gate driver (e.g. one or more gate drivers) which may be collectively referred to as the gate driver 20G, and a display panel 20P. For better comprehension, the host system shown in FIG. 1 may be implemented within an automotive vehicle such as a car, a bus, etc., and may be arranged to control operations of the automotive vehicle, where the display module 20 (e.g. the display panel 20P, etc. thereof) may represent a liquid crystal display (LCD) module (e.g. an LCD panel, etc. thereof) implemented according to LCD technologies, but the present invention is not limited thereto. For example, the display module 20 may be one of other types of display modules implemented according to other technologies, and more particularly, the architecture thereof may vary when there is a need. In some embodiments, the host system shown in FIG. 1 may be implemented within any of some other types of vehicles.

The timing controller 100 may perform display control (e.g. perform timing control, image enhancement, etc.) on the display panel 20P through the source driver 20S and the gate driver 20G, and more particularly, may output associated display control signals to the source driver 20S and the gate driver 20G and output video signals to the source driver 20S, for controlling the display panel 20P to display images, but the present invention is not limited thereto. As shown in FIG. 1, the timing controller 100 may comprise a hybrid over-current protection (OCP) detection circuit 100H, and the hybrid OCP detection circuit 100H may set at least one portion (e.g. a portion or all) of a plurality of fail detection flags 100F (labeled "FD flag" in FIG. 1, for brevity), where the fail detection flags 100F may represent a plurality of fail detection results, respectively, but the present invention is not limited thereto. The timing controller 100 is capable of performing fail detection to generate the plurality of fail detection results, and more particularly, is applicable to performing hybrid OCP detection in the display module 20, for example, by using the hybrid OCP detection circuit 100H.

Based on the architecture shown in FIG. 1, the timing controller 100 may receive at least one video input such as one or more video input signals carrying a series of image data and associated control signals such as a pixel clock, etc. from the host device 10, for example, through a video input path between the host device 10 and the timing controller 100 such as the upper path between them as shown in FIG. 1. In addition, the host device 10 may access (e.g. read or write) information in the timing controller 100, and more particularly, may write control information (CI) into the timing controller 100 and read fail detection information (FDI) such as the fail detection flags 100F from the timing controller 100, for example, through a communications path between the host device 10 and the timing controller 100 such as the lower path between them as shown in FIG. 1. The host device 10 may write any of multiple subsets of the CI, to configure the display module 20 through the timing controller 100, and may read any of multiple subsets of the FDI generated by the timing controller 100, to determine whether an error occurs and/or which of various types of errors occurs. Additionally, the CI and the FDI may be stored in a plurality of storage units such as a plurality of registers, for example, the plurality of registers may be implemented as a register bank (not shown in FIG. 1), where the multiple subsets of the CI and the multiple subsets of the FDI may be stored in multiple sets of registers in the plurality of registers within the register bank, such as a set of CI registers and a set of FDI registers, respectively, but the present invention is not limited thereto. According to some view points, the CI and the FDI may be stored as multiple sets of tables such as a set of CI table and a set of FDI table in the register bank (e.g. the set of CI registers and the set of FDI registers), respectively.

According to some embodiments, the video input path and the communications path may be implemented with at least one transmission cable (e.g. one or more transmission cables) conforming to at least one specification (e.g. one or more specifications) between the host device 10 and the display module 20 and an interface circuit conforming to the aforementioned at least one specification, where the interface circuit may be positioned in the display module 20, and more particularly, in the timing controller 100. For example, the aforementioned at least one transmission cable may comprise a video input cable and a communications cable. In some examples, the video input cable and the communications cable may be integrated into the same cable.

In the above embodiments, examples of the aforementioned at least one specification may include, but are not limited to: Serial Peripheral Interface (SPI) specification, Inter-Integrated Circuit ($I^2C$) specification, etc.

Figure 2:
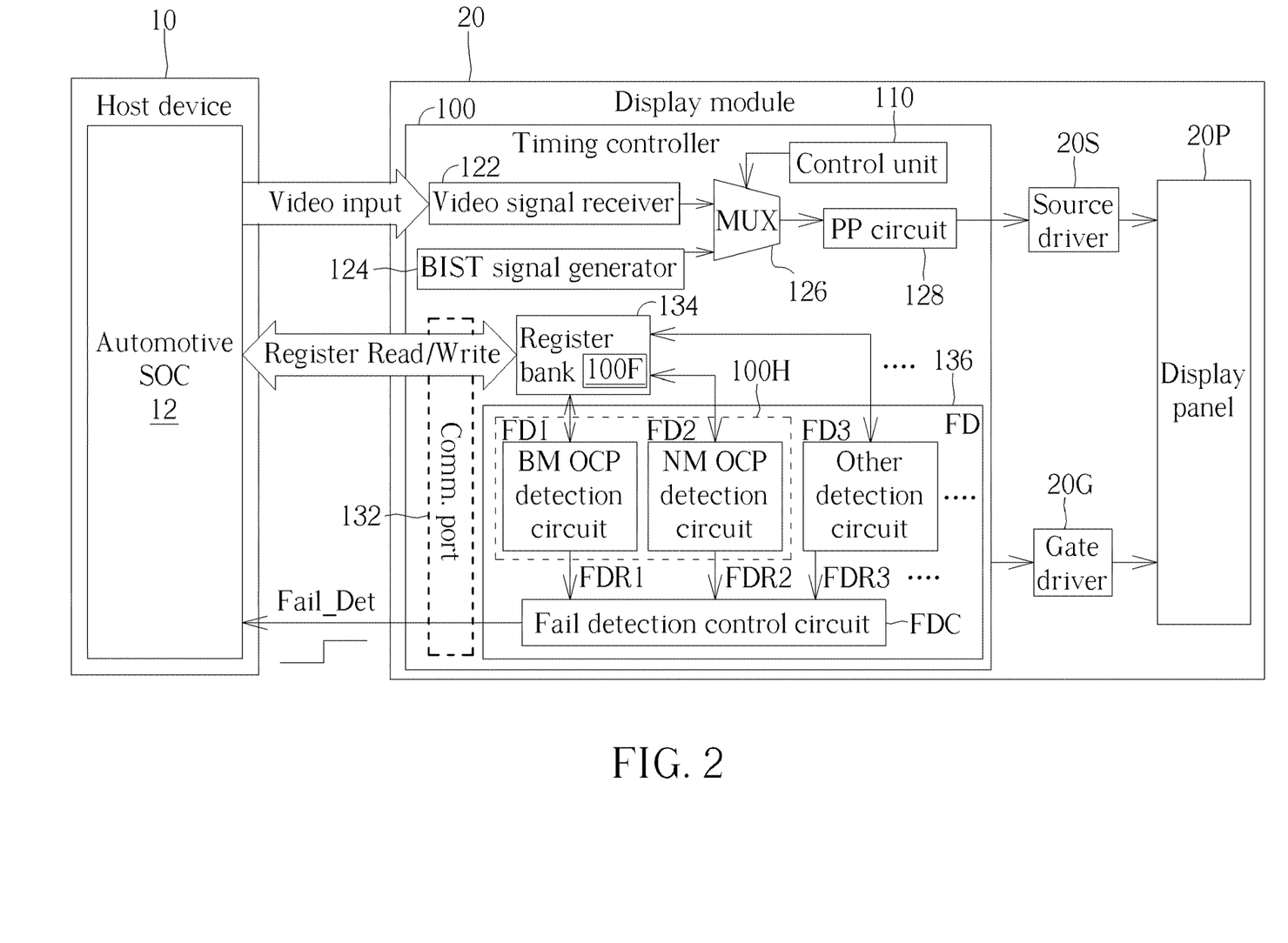
FIG. 2 illustrates a fail detection control scheme of a method for performing hybrid over-current protection (OCP) detection in a display module such as the display module shown in FIG. 1 according to an embodiment of the present invention.

FIG. 2 illustrates a fail detection control scheme of a method for performing hybrid OCP detection in a display module such as the display module 20 shown in FIG. 1 according to an embodiment of the present invention, where the timing controller 100 may operate according to the method. As shown in FIG. 2, the host device 10 may comprise an automotive system on chip (SOC) 12, for controlling operations of the host device 10. The timing controller 100 may comprise a control unit 110, a video signal receiver 122, a built-in self-test (BIST) signal generator 124, a multiplexer (MUX) 126, a post-processing (PP) circuit 128, a communications port 132 (labeled "Comm. port" in FIG. 2, for brevity), a register bank 134 that is coupled to the communications port 132, and a fail detection module 136 (labeled "FD" in FIG. 2, for brevity), and the fail detection module 136 may comprise a plurality of fail detection circuits {FD1, FD2, FD3, . . . } such as a first OCP detection circuit FD1, a second OCP detection circuit FD2, and other detection circuits FD3, etc. that are coupled to the register bank 134, and may further comprise a fail detection control circuit FDC that is coupled between the plurality of fail detection circuits {FD1, FD2, FD3, . . . } and the host device 10. For better comprehension, the first OCP detection circuit FD1 and the second OCP detection circuit FD2 may be labeled "BM OCP detection circuit" and "NM OCP detection circuit" in FIG. 2 to indicate that they may perform OCP detection in a BIST mode and a normal mode, respectively, where "BM" and "NM" stand for the BIST mode and the normal mode, respectively, but the present invention is not limited thereto. In addition, the hybrid OCP detection circuit 100H may comprise the first OCP detection circuit FD1 and the second OCP detection circuit FD2, and the plurality of fail detection flags 100F may be stored in the register bank 134. The upper path between the host device 10 and the timing controller 100 as shown in FIG. 2 may be taken as an example of the video input path mentioned above, and the remaining paths between the host device 10 and the timing controller 100 as shown in FIG. 2 may be taken as examples of the communications path mentioned above.

According to this embodiment, the control unit 110 may control operations of the timing controller 100, and more particularly, may control the timing controller 100 to switch between the BIST mode and the normal mode. The video signal receiver 122 may receive the aforementioned at least one video input and the associated control signals from the host device 10, and more particularly, may perform signal interfacing to convert the above signals into signals corresponding to the normal mode, such as one or more normal video signals carrying the series of image data and the display control signals, and output these signals as a first set of input signals of the MUX 126, for being used in the normal mode, where the video signal receiver 122 may comprise the interface circuit for performing the signal interfacing, but the present invention is not limited thereto. For example, in a situation where the signals from the host device 10 can be directly used, the signal interfacing may be omitted. No matter whether the signal interfacing is required or not, the display control signals may originate from the control signals obtained from the host device 10. In addition, the display module 20 may perform BIST operations in the BIST mode. For example, the BIST signal generator 124 may generate self-generated display control signals, and more particularly, generate signals corresponding to the BIST mode (which may replace the signals corresponding to the normal mode), such as one or more BIST video signals carrying a series of BIST image data and the associated display control signals, and output these signals as a second set of input signals of the MUX 126, for being used in the BIST mode.

Under control of the control unit 110, the MUX 126 may select one set of input signals from the first set of input signals and the second set of input signals, for being used in a corresponding mode (e.g. the normal mode or the BIST mode). As a result, the PP circuit 128 may obtain the selected set of input signals from the MUX 126 to perform PP operations on this set of input signals, for performing display control on the display panel 20P through the source driver 20S and the gate driver 20G. Please note that, the display module 20 is applicable to displaying information (more particularly, host-generated display information) such as the series of image data for the host device 10 in the normal mode, and displaying internally generated display information such as the series of BIST image data in the BIST mode. For example, in the normal mode, the display module 20 may operate according to host-generated display control signals from the host device 10 (e.g. the display control signals within the first set of input signals, such as the control signals from the host device 10 or the derivative thereof). For another example, in the BIST mode, the display module 20 may operate according to the self-generated display control signals (e.g. the associated display control signals within the second set of input signals).

Based on the architecture shown in FIG. 2, the communications port 132 may be arranged to perform communications with the host device 10 for the timing controller 100, and the register bank 134 may be arranged to store information (e.g. the CI and the FDI) for the timing controller 100, to allow the host device 10 to access the information (e.g. the CI and the FDI) in the register bank 134 through the communications port 132. The plurality of fail detection circuits {FD1, FD2, FD3, . . . } such as the first OCP detection circuit FD1, the second OCP detection circuit FD2, and the other detection circuits FD3, etc. may perform fail detection operations to generate the plurality of fail detection results such as {FDR1, FDR2, FDR3, . . . } (e.g. a first OCP detection result FDR1, a second OCP detection result FDR2, other detection results FDR3, etc.), respectively, and may output the plurality of fail detection results {FDR1, FDR2, FDR3, . . . } to the fail detection control circuit FDC, to allow the fail detection control circuit FDC to generate a fail detection signal Fail_Det according to the plurality of fail detection results {FDR1, FDR2, FDR3, . . . }, where any of the plurality of fail detection circuits {FD1, FD2, FD3, . . . } may change a logic state of a corresponding fail detection result such as one of fail detection results {FDR1, FDR2, FDR3, . . . } (e.g. by pulling up the voltage level thereof) to indicate that a corresponding error occurs, and the fail detection control circuit FDC may change a logic state of the fail detection signal Fail_Det (e.g. by pulling up the voltage level of the fail detection signal Fail_Det) when any of the plurality of fail detection results {FDR1, FDR2, FDR3, . . . } indicates that an error such as the corresponding error mentioned above occurs, but the present invention is not limited thereto. For example, the plurality of fail detection circuits {FD1, FD2, FD3, . . . } may also output the plurality of fail detection results {FDR1, FDR2, FDR3, . . . } to the register bank 134, for being stored in the register bank 134.

During initialization of the display module 20, after a set of driving voltages have been established, the first OCP detection circuit FD1 (such as the BM OCP detection circuit) may perform first OCP detection in the BIST mode to generate the first OCP detection result FDR1, and write the first OCP detection result FDR1 into the register bank 134 (e.g. one or more FDI registers within the set of FDI registers), for being accessed (e.g. read) by the host device 10. The second OCP detection circuit FD2 (such as the NM OCP detection circuit) may perform second OCP detection in the normal mode to generate the second OCP detection result FDR2, and write the second OCP detection result FDR2 into the register bank (e.g. one or more FDI registers within the set of FDI registers), for being accessed (e.g. read) by the host device 10. For better comprehension, the first OCP detection result FDR1 may indicate whether an OCP error of the display module 20 that is due to the display module 20 occurs, and the second OCP detection result FDR2 may indicate whether an OCP error of the display module 20 that is due to the host device 10 occurs, where a combination of the first OCP detection result FDR1 and the second OCP detection result FDR2 may indicate whether at least one OCP error (e.g. one or more OCP errors) of the display module 20 is caused by the display module 20 or the host device 10, but the present invention is not limited thereto.

As the timing controller 100 can generate both of the first OCP detection result FDR1 and the second OCP detection result FDR2, and more particularly, store both of the first OCP detection result FDR1 and the second OCP detection result FDR2 in the register bank 134, for being accessed (e.g. read) by the host device 10, the method and the associated apparatus (e.g. the timing controller 100) can guarantee that sufficient information for correct judgment regarding whether the display side or the host side malfunctions is available, to prevent the related art problems. Thus, the present invention can provide robust fail detection mechanism.

Figure 3:
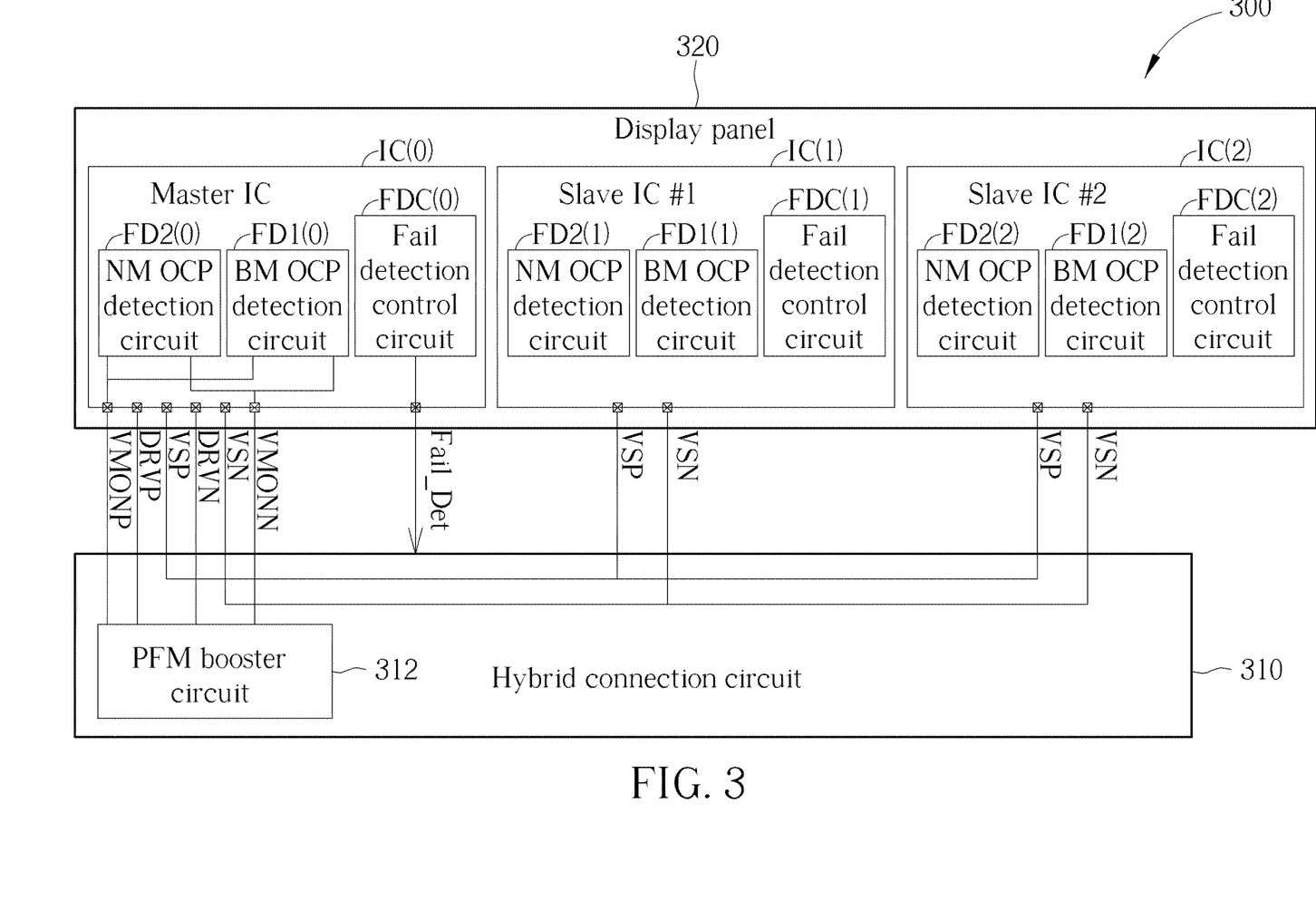
FIG. 3 illustrates an OCP control scheme of the method according to an embodiment of the present invention, where a display module based on the OCP control scheme shown in FIG. 2 may be taken as an example of the display module shown in FIG. 1.

FIG. 3 illustrates an OCP control scheme of the method according to an embodiment of the present invention, where a display module 300 based on the OCP control scheme shown in FIG. 2 may be taken as an example of the display module 20 shown in FIG. 1. The display module 300 may comprise a display panel 320 (which may be taken as an example of the display panel 20P) and a hybrid connection circuit 310 coupled between the display panel 320 and the host device 10, and more particularly, may comprise at least one integrated circuit (IC) installed on the display panel 320, such as the ICs {IC(0), IC(1), IC(2)}. For example, the aforementioned at least one source driver such as the source driver 20S may comprise multiple source drivers respectively implemented on the ICs {IC(0), IC(1), IC(2)}, for performing display control on multiple sub-regions of a display region of the display panel 320, respectively, and the aforementioned at least one gate driver such as the gate driver 20G may comprise multiple gate drivers respectively implemented on other ICs (which may also be installed on the display panel 320). In addition, the timing controller 100 may be implemented on each of the ICs {IC(0), IC(1), IC(2)}, where respective fail detection circuits {{FD1(0), FD2(0), ... }, {FD1(1), FD2(1), ... }, {FD1(2), FD2(2), ... }} (such as respective BM OCP detection circuits, respective NM OCP detection circuits, etc.) and respective fail detection control circuits {FDC(0), FDC(1), FDC(2)} of the ICs {IC(0), IC(1), IC(2)} may correspond to the plurality of fail detection circuits {FD1, FD2, ... } (such as the BM OCP detection circuit, the NM OCP detection circuit, etc.) and the fail detection control circuit FDC of the timing controller 100 shown in FIG. 2, respectively.

Based on a set of predetermined settings of the display panel 320, the fail detection circuits {FD1(0), FD2(0), ... } and the fail detection control circuit FDC(0) of the IC IC(0) may be enabled or turned on, and the fail detection circuits {{FD1(1), FD2(1), ... }, {FD1(2), FD2(2), ... }} and the fail detection control circuits {FDC(1), FDC(2)} of the ICs {IC(1), IC(2)} may be disabled or turned off, and therefore, the IC IC(0) may be referred to as the master IC and the ICs {IC(1), IC(2)} may be referred to as the slave ICs #1 and #2, but the present invention is not limited thereto. As shown in FIG. 3, the hybrid connection circuit 310 may comprise a pulse-frequency modulation (PFM) booster circuit 312, and may be coupled to the display panel 320 through multiple connection paths, for transmission of multiple signals such as a set of voltage signals VSP and VSN, a set of monitored voltages VMONP and VMONN, a set of driving voltages DRVP and DRVN, the fail detection signal Fail_Det, etc. between the hybrid connection circuit 310 and the display panel 320, where the multiple connection paths may be coupled to corresponding terminals (e.g. pads) of the ICs {IC(0), IC(1), IC(2)}. For example, the hybrid connection circuit 310 may be implemented with a flexible printed circuit (FPC). or a printed circuit board (PCB), and the PFM booster circuit 312 may be installed thereon. For brevity, similar descriptions for this embodiment are not repeated in detail here.

Figure 4:
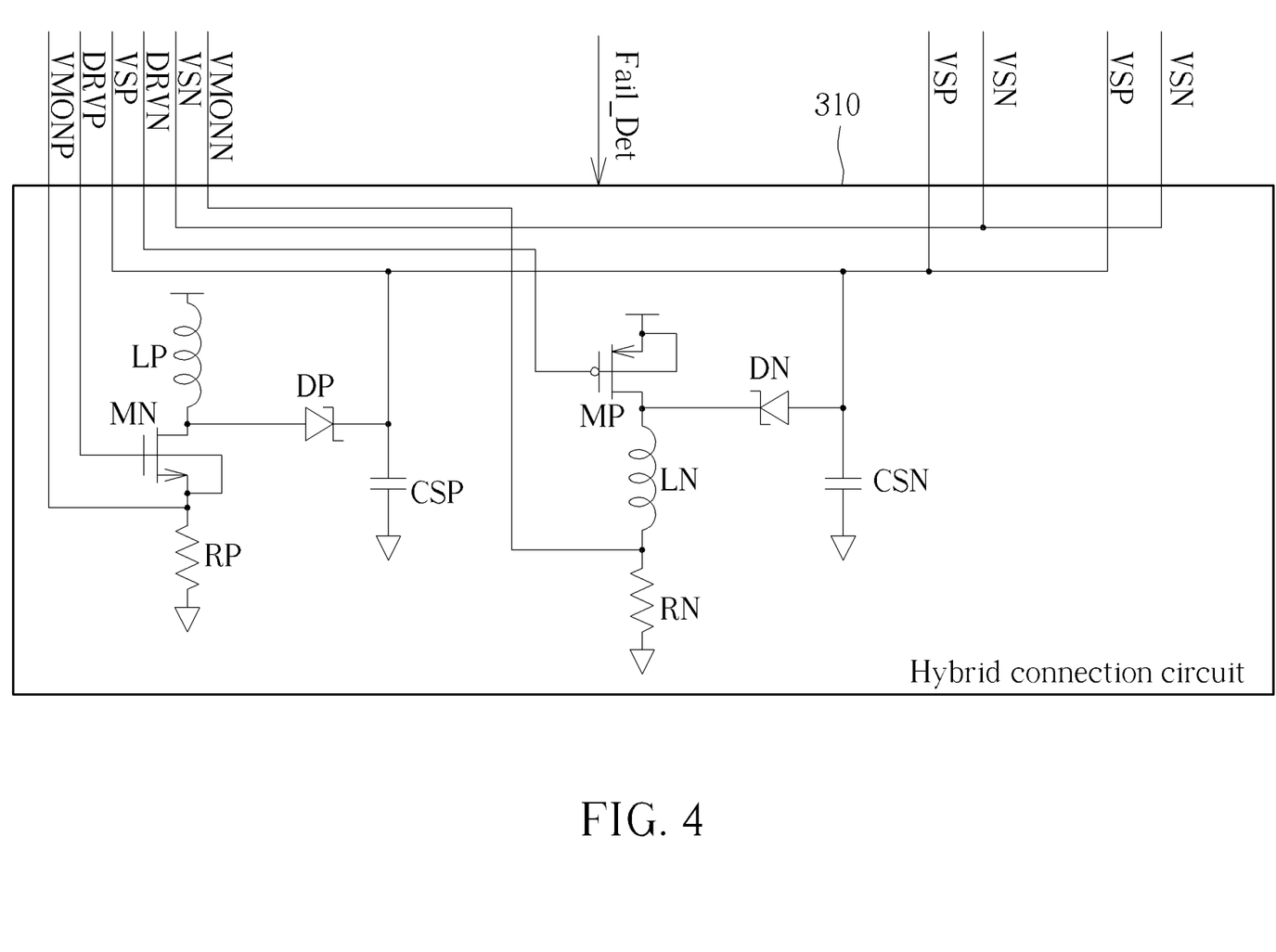
FIG. 4 illustrates some implementation details of the display module shown in FIG. 3.

FIG. 4 illustrates some implementation details of the display module 300 shown in FIG. 3. The hybrid connection circuit 310 may comprise multiple transistors MN and MP (e.g. Metal Oxide Semiconductor Field Effect Transistors (MOSFETs) such as N-type and P-type MOSFETs), multiple resistors RP and RN, multiple inductors LP and LN, multiple capacitors CSP and CSN, and multiple diodes DP and DN, and the above components may be coupled to form a first and a second sub-circuits such as the left half and the right half of the architecture shown in FIG. 4, respectively. For brevity, similar descriptions for this embodiment are not repeated in detail here.

Figure 5:
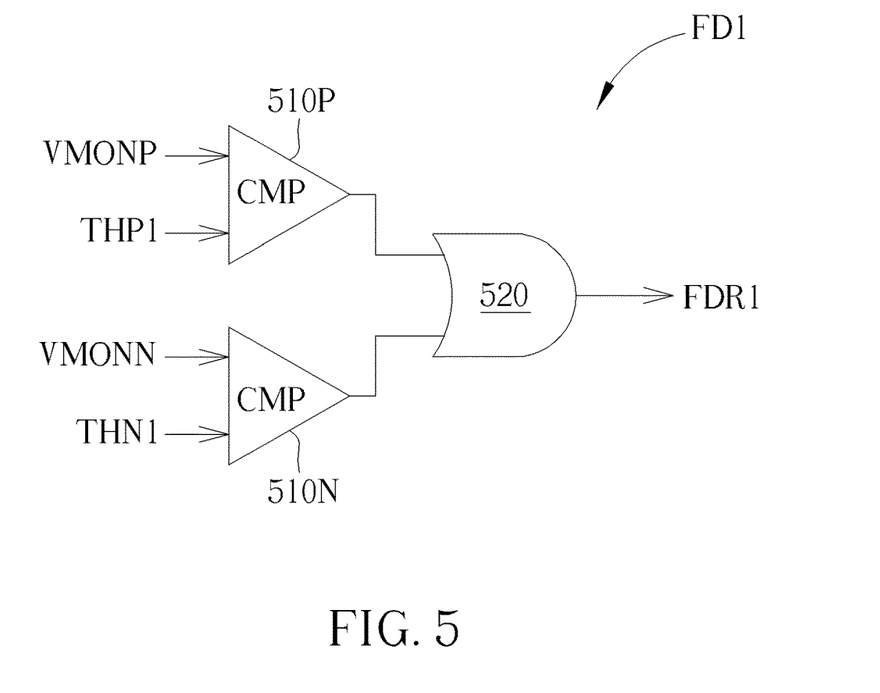
FIG. 5 illustrates an example of a first OCP detection circuit in the architecture shown in FIG. 2.

FIG. 5 illustrates an example of the first OCP detection circuit FD1 (such as the BM OCP detection circuit) in the architecture shown in FIG. 2. The first OCP detection circuit FD1 may comprise a set of first comparators 510P and 510N (labeled "CMP" in FIG. 5 for brevity) and a first logic gate 520 (e.g. an OR gate) that is coupled to the set of first comparators 510P and 510N. The set of first comparators 510P and 510N may compare the set of monitored voltages VMONP and VMONN with a set of first voltage thresholds THP1 and THN1 to generate a set of first comparison results, respectively. In addition, the first logic gate 520 may perform a logic operation (e.g. an OR operation) according to the set of first comparison results (e.g. the outputs of the set of first comparators 510P and 510N) to generate the first OCP detection result FDR1, where the first OCP detection result FDR1 may indicate whether any of the set of monitored voltages VMONP and VMONN (e.g. any of the monitored voltages VMONP and VMONN) reaches a corresponding voltage threshold within the set of first voltage thresholds THP1 and THN1, but the present invention is not limited thereto. For example, the first OCP detection result FDR1 may further indicate whether a current associated with said any of the set of monitored voltages VMONP and VMONN reaches a corresponding current threshold. For brevity, similar descriptions for this embodiment are not repeated in detail here.

Figure 6:
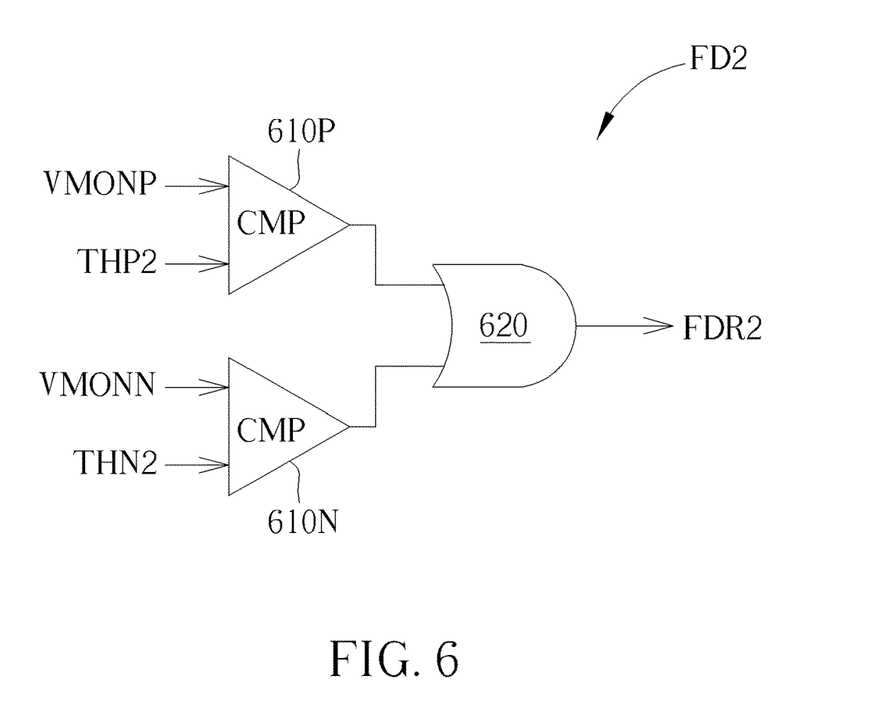
FIG. 6 illustrates an example of a second OCP detection circuit in the architecture shown in FIG. 2.

FIG. 6 illustrates an example of the second OCP detection circuit FD2 (such as the NM OCP detection circuit) in the architecture shown in FIG. 2. The second OCP detection circuit FD2 may comprise a set of second comparators 610P and 610N (labeled "CMP" in FIG. 6 for brevity) and a second logic gate 620 (e.g. an OR gate) that is coupled to the set of second comparators 610P and 610N. The set of second comparators 610P and 610N may compare the set of monitored voltages VMONP and VMONN with a set of second voltage thresholds THP2 and THN2 to generate a set of second comparison results, respectively. In addition, the second logic gate 620 may perform a logic operation (e.g. an OR operation) according to the set of second comparison results (e.g. the outputs of the set of second comparators 610P and 610N) to generate the second OCP detection result FDR2, where the second OCP detection result FDR2 may indicate whether a monitored voltage of the set of monitored voltages VMONP and VMONN (e.g. any of the monitored voltages VMONP and VMONN) reaches a corresponding voltage threshold within the set of second voltage thresholds THP2 and THN2, but the present invention is not limited thereto. For example, the second OCP detection result FDR2 may further indicate whether the current associated with this monitored voltage of the set of monitored voltages VMONP and VMONN reaches another current threshold. For brevity, similar descriptions for this embodiment are not repeated in detail here.

According to some embodiments, the first OCP detection result FDR1 may indicate whether the current associated with said any of the set of monitored voltages VMONP and VMONN reaches the corresponding current threshold, and the second OCP detection result FDR2 may indicate whether the current associated with the monitored voltage of the set of monitored voltages VMONP and VMONN reaches the other current threshold. For brevity, similar descriptions for these embodiments are not repeated in detail here.

Figure 7:
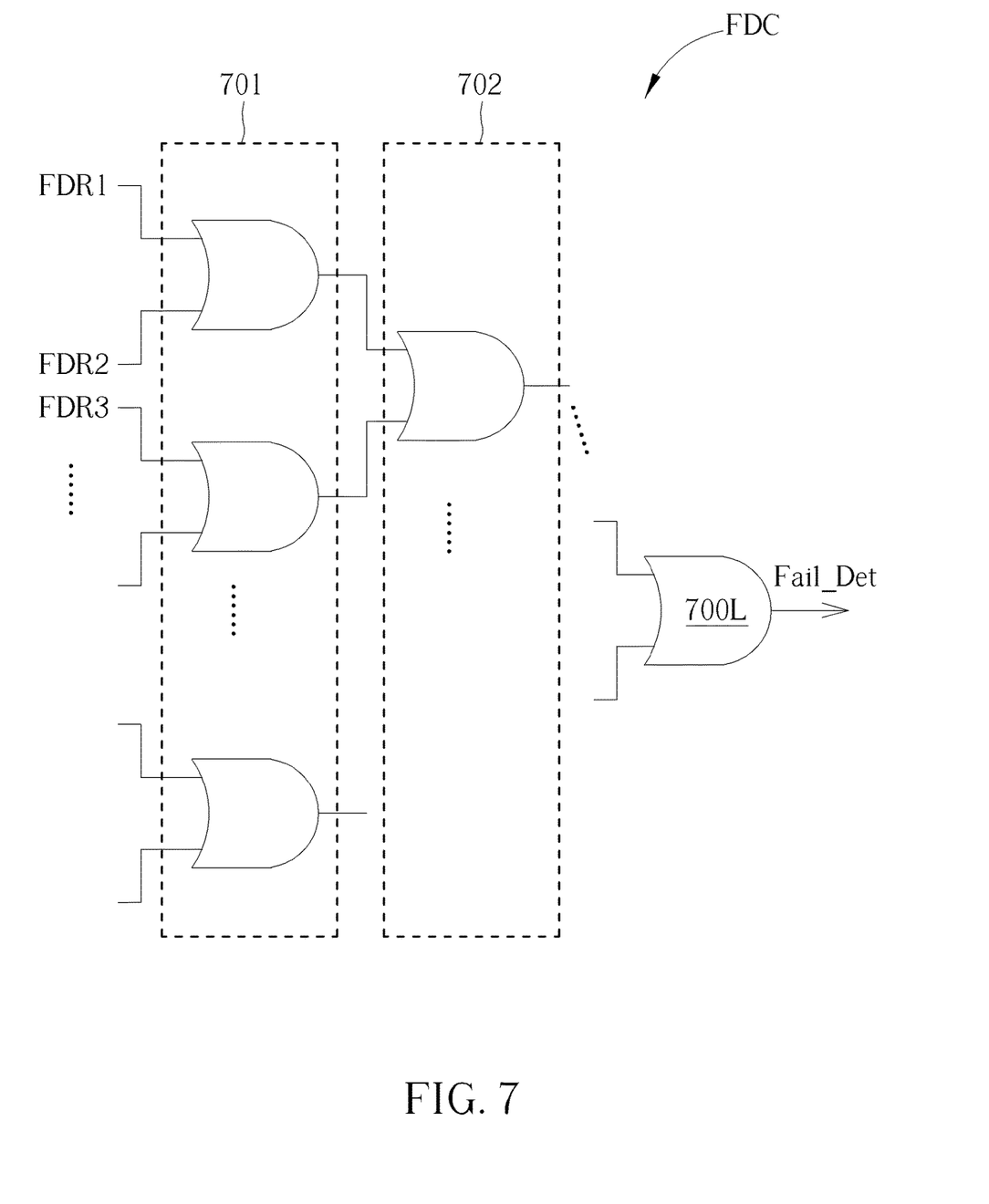
FIG. 7 illustrates an example of a fail detection control circuit in the architecture shown in FIG. 2.

FIG. 7 illustrates an example of the fail detection control circuit FDC in the architecture shown in FIG. 2. The fail detection control circuit FDC may comprise a plurality of logic gates (e.g. OR gates) such as a first set of logic gates 701 (e.g. the first column of OR gates), a second set of logic gates 702 (e.g. the second column of OR gates), etc., and the last logic gate 700L (e.g. the last OR gate in the last column) of the plurality of logic gates may output the fail detection signal Fail_Det. The plurality of logic gates may perform logic operations (e.g. OR operations) according to the plurality of fail detection results {FDR1, FDR2, FDR3, ... } such as the first OCP detection result FDR1, the second OCP detection result FDR2, the other detection results FDR3, etc. For brevity, similar descriptions for this embodiment are not repeated in detail here.

Figure 8:
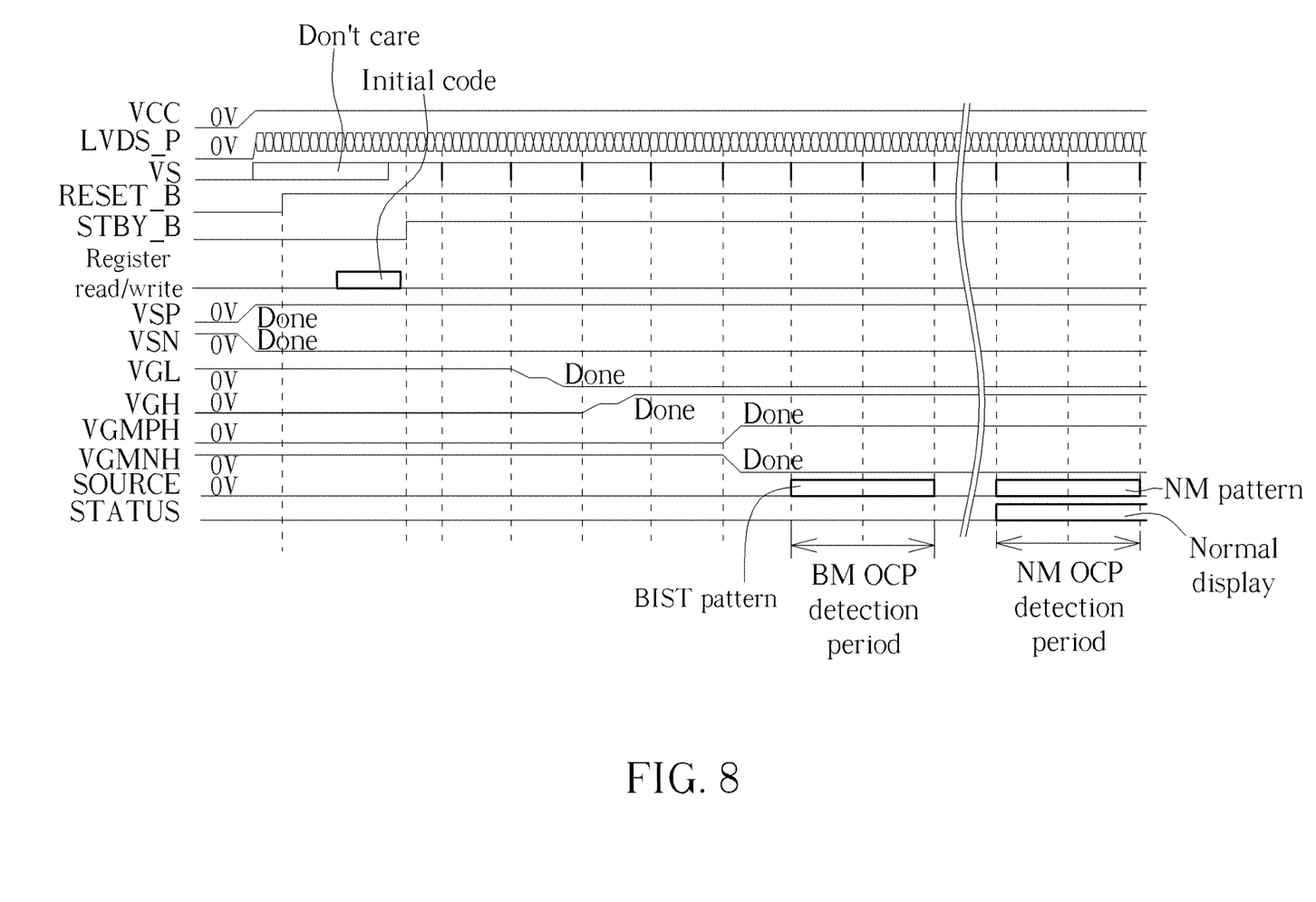
FIG. 8 illustrates a timing chart of some signals involved with the method according to an embodiment of the present invention.

FIG. 8 illustrates a timing chart of some signals {VCC, LVDS_P, VS, RESET_B, STBY_B, VSP, VSN VGL, VGH, VGMPH, VGMNH, SOURCE} involved with the method according to an embodiment of the present invention, where a curve labeled "Register read/write" may indicate operations of reading or writing one or more registers in the register bank 134, and a curve labeled "STATUS" may indicate the associated status of the display module 20 (e.g. the timing controller 100). For example, the signal VCC may comprise at least one power signal (e.g. one or more power signals such as VCC1, VCC2, etc.), the signal LVDS_P may represent a low voltage differential signaling (LVDS) pair (e.g. any LVDS pair of multiple LVDS pairs), and some additional signals corresponding to the signals {VGMPH, VGMNH} may have similar waveforms as that of the signals {VGMPH, VGMNH}, and therefore may be omitted, but the present invention is not limited thereto. For better comprehension, during the initialization of the display module 20, some signals such as the signals {VSP, VSN, VGL, VGH, VGMPH, VGMNH} may be pulled up or pulled down from 0 Volts (V), and when the voltage levels thereof reach respective target voltage levels of these signals, the establishment of these signals may be regarded as completed (labeled "Done" in FIG. 8 for brevity); the signal VS is not ready in a beginning phase labeled "Don't care", and may carry some pulses (e.g. a series of low pules) in a subsequent phase, where at least one portion (e.g. a portion or all) of these pulses may indicate time points of frame switching (e.g. switching from a certain frame to the next frame thereof); and the host device 10 may access (e.g. read or write) one or more initial codes during the initialization of the display module 20; but the present invention is not limited thereto.

As shown in FIG. 8, under control of the timing controller 100, the internally generated display information such as the series of BIST image data may comprise one or more BIST patterns transmitted in a BM OCP detection period, for performing the first OCP detection such as the BM OCP detection, and the length of the BM OCP detection period may be equal to that of two frames, but the present invention is not limited thereto. For example, the length of the BM OCP detection period may be equal to that of two or more frames, and the timing controller 100 may control the number of frames of the BM OCP detection period according to a first partial CI (e.g. a portion of the CI), where the first partial CI may be stored in a CI table of the set of CI table, such as one or more CI registers of the set of CI registers. In addition, under control of the timing controller 100, the internally generated display information may further comprise one or more normal mode patterns (labeled "NM pattern" in FIG. 8 for brevity) transmitted in a NM OCP detection period, for performing the second OCP detection such as the NM OCP detection, and the length of the NM OCP detection period may be equal to that of two frames, but the present invention is not limited thereto. For example, the length of the NM OCP detection period may be equal to that of two or more frames, and the timing controller 100 may control the number of frames of the NM OCP detection period according to a second partial CI (e.g. another portion of the CI), where the second partial CI may be stored in this CI table. Additionally, the timing controller 100 may control the display panel 20P to perform normal display. For example, the normal display may comprise the operations of displaying the one or more normal mode patterns and the host-generated display information such as the series of image data. For brevity, similar descriptions for this embodiment are not repeated in detail here.

According to some embodiments, the first partial CI and the second partial CI may be stored in different CI tables of the set of CI table, such as different CI registers of the set of CI registers. For brevity, similar descriptions for these embodiments are not repeated in detail here.

According to some embodiments, under control of the timing controller 100, the one or more BIST patterns may represent one or more black patterns to make the display panel 20P display a black screen. For brevity, similar descriptions for these embodiments are not repeated in detail here.

For better comprehension, some of the signals shown in FIG. 8, such as the signals {VSP, VSN, VGL, VGH, VGMPH, VGMNH}, preferably, the signals {VGMPH, VGMNH}, may be taken as examples of the set of driving voltages, but the present invention is not limited thereto.

Figure 9:
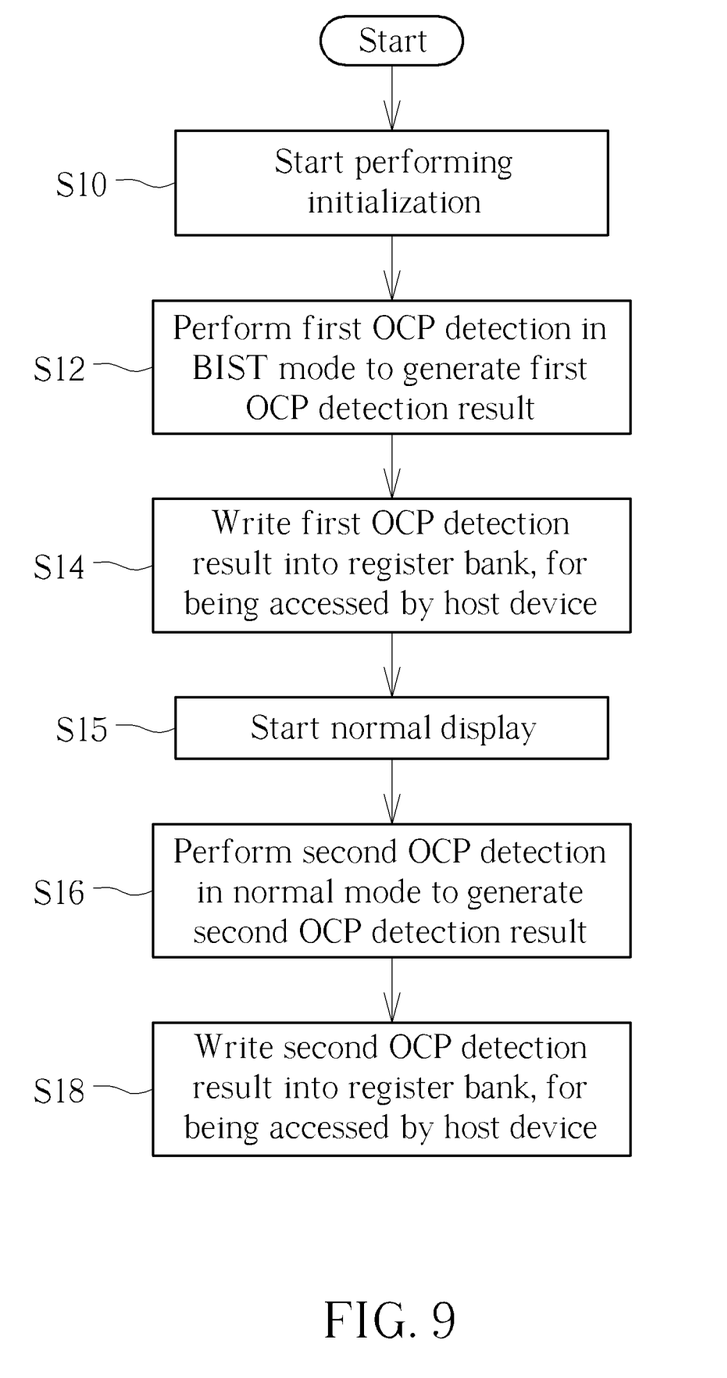
FIG. 9 is a flowchart of the method according to an embodiment of the present invention.

FIG. 9 is a flowchart of the method according to an embodiment of the present invention. The working flow shown in FIG. 9 may be applied to the timing controller 100 (e.g. the components thereof).

In Step S10, the timing controller 100 may start performing the initialization of the display module 20.

In Step S12, after the set of driving voltages have been established, the timing controller 100 (e.g. the first OCP detection circuit FD1 such as the BM OCP detection circuit) may perform the first OCP detection in the BIST mode to generate the first OCP detection result FDR1.

In Step S14, the timing controller 100 (e.g. the first OCP detection circuit FD1 such as the BM OCP detection circuit) may write the first OCP detection result FDR1 into the register bank 134 (e.g. one or more FDI registers within the set of FDI registers), for being accessed (e.g. read) by the host device 10.

In Step S15, the timing controller 100 may start the normal display.

In Step S16, the timing controller 100 (e.g. the second OCP detection circuit FD2 such as the NM OCP detection circuit) may perform the second OCP detection in the normal mode to generate the second OCP detection result FDR2.

In Step S18, the timing controller 100 (e.g. the second OCP detection circuit FD2 such as the NM OCP detection circuit) may write the second OCP detection result FDR2 into the register bank (e.g. one or more FDI registers within the set of FDI registers), for being accessed (e.g. read) by the host device 10. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9.

TABLE 1

| Register | FDI | Description |
| --- | --- | --- |
| FD_Flag | PFM_NG_FAIL | PFM check fail |
|  | OTP_FAIL | OTP trimming or reload fail |
|  | EEPROM_FAIL | EEPROM checksum fail |
|  | GATE_FAIL | Gate fail |
|  | LVDS_FAIL | LVDS unlocked fail |

TABLE 1-continued

| | OCP_Fail | Overcurrent protection |
|---|---|---|
| OCP_Fail_Normal | OCP_Fail_BIST | Possible reason of failure |
| 0 | 0 | NA |
| 0 | 1 | Abnormal power consumption in BIST mode |
| 1 | 0 | Erroneous input signal from host device |
| 1 | 1 | Failure of display panel |

Table 1 illustrates an example of a register FD_Flag in the register bank 134, where the register FD_Flag may comprise a set of FDI {PFM_NG_FAIL, OTP_FAIL, EEPROM_FAIL, GATE_FAIL, LVDS_FAIL, OCP_Fail}, and the FDI OCP_Fail comprising the FDI {OCP_Fail_Normal, OCP_Fail_BIST} may be regarded as a hybrid FD flag {OCP_Fail_Normal, OCP_Fail_BIST} comprising two FD flags OCP_Fail_BIST and OCP_Fail_Normal. The timing controller 100 may utilize the combination (e.g. the hybrid FD flag {OCP_Fail_Normal, OCP_Fail_BIST}) of the first OCP detection result FDR1 (e.g. the FD flag OCP_Fail_BIST) and the second OCP detection result FDR2 (e.g. the FD flag OCP_Fail_Normal) to indicate whether at least one OCP error (e.g. one or more OCP errors) of the display module 20 is caused by the display module 20 or the host device 10. For example, {OCP_Fail_Normal, OCP_Fail_BIST}={0, 0} may indicate that there is no OCP error (e.g. normal power consumption of the display panel 20P may be detected), and the reason of failure is not available (NA); {OCP_Fail_Normal, OCP_Fail_BIST}={0, 1} may indicate that abnormal power consumption (e.g. high power consumption of the display panel 20P) is detected in the BIST mode; {OCP_Fail_Normal, OCP_Fail_BIST}={1, 0} may indicate that one or more input signals from the host device 10 are erroneous (e.g. the pixel clock may be too fast); and {OCP_Fail_Normal, OCP_Fail_BIST}={1, 1} may indicate that failure of the display panel 20P is detected. For brevity, similar descriptions for this embodiment are not repeated in detail here.

TABLE 2

| | | Description | |
|---|---|---|---|
| Register | CI VMONPS_BM[1:0] | THP1 of VMONP | I_VSP_OCP1 of I_VSP |
| OCP_BIST_Sel | 0  0 | 0.06 V | ~60 mA |
| | 0  1 | 0.07 V | ~70 mA |
| | 1  0 | 0.08 V | ~80 mA |
| | 1  1 | 0.10 V | ~100 mA |
| | VMONNS_BM[1:0] | THN1 of VMONN | I_VSN_OCP1 of I_VSN |
| | 0  0 | 0.06 V | ~60 mA |
| | 0  1 | 0.07 V | ~70 mA |
| | 1  0 | 0.08 V | ~80 mA |
| | 1  1 | 0.10 V | ~100 mA |

Table 2 illustrates an example of a register OCP_BIST_Sel in the register bank 134, where the register OCP_BIST_Sel may comprise a set of CI {VMONPS_BM[1:0], VMONNS_BM[1:0]}, and the set of CI {VMONPS_BM[1:0], VMONNS_BM[1:0]} may be stored in a CI table of the set of CI table (e.g. a CI register of the set of CI registers, such as the register OCP_BIST_Sel). The timing controller 100 may control the set of first voltage thresholds THP1 and THN1 (e.g. the respective voltage thresholds THP1 and THN1 of the set of monitored voltages VMONP and VMONN) according to the register OCP_BIST_Sel, to control respective current threshold {I_VSP_OCP1, I_VSN_OCP1} of the currents {I_VSP, I_VSN} respectively associated with the set of monitored voltages VMONP and VMONN, and the currents {I_VSP, I_VSN} may represent the respective currents of the set of voltage signals {VSP, VSN} output from the first and the second sub-circuits of the architecture shown in FIG. 4. For example, when the CI VMONPS_BM[1:0] is equal to {0, 0}, THP1=0.06 V (Volt) and I_VSP_OCP1~60 mA (milliampere); when the CI VMONPS_BM[1:0] is equal to {0, 1}, THP1=0.07 V and I_VSP_OCP1~70 mA; and the rest may be deduced by analogy. For another example, when the CI VMONNS_BM[1:0] is equal to {0, 0}, THN1=0.06 V and I_VSN_OCP1~60 mA; when the CI VMONNS_BM[1:0] is equal to {0, 1}, THN1=0.07 V and I_VSN_OCP1~70 mA; and the rest may be deduced by analogy. For brevity, similar descriptions for this embodiment are not repeated in detail here.

TABLE 3

| | | Description | |
|---|---|---|---|
| Register | CI VMONPS_NM[1:0] | THP2 of VMONP | I_VSP_OCP2 of I_VSP |
| OCP_Normal_Sel | 0  0 | 0.4 V | ~400 mA |
| | 0  1 | 0.6 V | ~600 mA |
| | 1  0 | 0.8 V | ~800 mA |
| | 1  1 | 1.0 V | ~1000 mA |
| | VMONNS_NM[1:0] | THN2 of VMONN | I_VSN_OCP2 of I_VSN |
| | 0  0 | 0.4 V | ~400 mA |
| | 0  1 | 0.6 V | ~600 mA |
| | 1  0 | 0.8 V | ~800 mA |
| | 1  1 | 1.0 V | ~1000 mA |

Table 3 illustrates an example of a register OCP_Normal_Sel in the register bank 134, where the register OCP_Normal_Sel may comprise a set of CI {VMONPS_NM[1:0], VMONNS_NM[1:0]}, and the set of CI {VMONPS_NM[1:0], VMONNS_NM[1:0]} may be stored in a CI table of the set of CI table (e.g. a CI register of the set of CI registers, such as the register OCP_Normal_Sel). The timing controller 100 may control the set of second voltage thresholds THP2 and THN2 (e.g. the respective voltage thresholds THP2 and THN2 of the set of monitored voltages VMONP and VMONN) according to the register OCP_Normal_Sel, to control respective current threshold {I_VSP_OCP2, I_VSN_OCP2} of the currents {I_VSP, I_VSN} respectively associated with the set of monitored voltages VMONP and VMONN. For example, when the CI VMONPS_NM[1:0] is equal to {0, 0}, THP2=0.4 V and I_VSP_OCP2~400 mA; when the CI VMONPS_NM[1:0] is equal to {0, 1}, THP2=0.6 V and I_VSP_OCP2~600 mA; and the rest may be deduced by analogy. For another example, when the CI VMONNS_NM[1:0] is equal to {0, 0}, THN2=0.4 V and I_VSN_OCP2~400 mA; when the CI VMONNS_NM[1:0] is equal to {0, 1}, THN2=0.6 V and I_VSN_OCP2~600 mA; and the rest may be deduced by analogy. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing hybrid over-current protection (OCP) detection in a display module, the method comprising:
    during initialization of the display module, after a set of driving voltages have been established, performing first OCP detection in a built-in self-test (BIST) mode to generate a first OCP detection result;
    writing the first OCP detection result into a register bank, for being accessed by a host device, wherein the display module is applicable to displaying information for the host device;
    performing second OCP detection in a normal mode to generate a second OCP detection result; and
    writing the second OCP detection result into the register bank, for being accessed by the host device, wherein a combination of the first OCP detection result and the second OCP detection result indicates whether at least one OCP error of the display module is caused by the display module or the host device.

2. The method of claim 1, wherein in the BIST mode, the display module operates according to self-generated display control signals; and in the normal mode, the display module operates according to host-generated display control signals from the host device.

3. The method of claim 1, wherein the first OCP detection result indicates whether an OCP error of the display module that is due to the display module occurs.

4. The method of claim 1, wherein the step of performing the first OCP detection further comprises:
    comparing a set of monitored voltages with a set of first voltage thresholds, respectively, to generate the first OCP detection result, wherein the first OCP detection result indicates whether any of the set of monitored voltages reaches a corresponding voltage threshold within the set of first voltage thresholds.

5. The method of claim 4, wherein the first OCP detection result further indicates whether a current associated with said any of the set of monitored voltages reaches a corresponding current threshold.

6. The method of claim 4, wherein the step of performing the second OCP detection further comprises:
    comparing the set of monitored voltages with a set of second voltage thresholds, respectively, to generate the second OCP detection result, wherein the second OCP detection result indicates whether a monitored voltage of the set of monitored voltages reaches a corresponding voltage threshold within the set of second voltage thresholds.

7. The method of claim 6, wherein the first OCP detection result further indicates whether a current associated with said any of the set of monitored voltages reaches a corresponding current threshold; and the second OCP detection result further indicates whether a current associated with the monitored voltage of the set of monitored voltages reaches another current threshold.

8. A timing controller, applicable to performing hybrid over-current protection (OCP) detection in a display module, the timing controller comprising:
    a communications port, arranged to perform communications with a host device for the timing controller;
    a register bank, coupled to the communications port, arranged to store information for the timing controller;
    a first OCP detection circuit, coupled to the register bank, wherein during initialization of the display module, after a set of driving voltages have been established, the first OCP detection circuit performs first OCP detection in a built-in self-test (BIST) mode to generate a first OCP detection result, and writes the first OCP detection result into the register bank, for being accessed by the host device, wherein the display module is applicable to displaying information for the host device; and
    a second OCP detection circuit, coupled to the register bank, arranged to perform second OCP detection in a normal mode to generate a second OCP detection result, and write the second OCP detection result into the register bank, for being accessed by the host device, wherein a combination of the first OCP detection result and the second OCP detection result indicates whether at least one OCP error of the display module is caused by the display module or the host device.

9. The timing controller of claim 8, further comprising:
    a BIST signal generator, arranged to generate self-generated display control signals;
    wherein:
    in the BIST mode, the display module operates according to the self-generated display control signals; and
    in the normal mode, the display module operates according to host-generated display control signals from the host device.

10. The timing controller of claim 8, wherein the first OCP detection result indicates whether an OCP error of the display module that is due to the display module occurs.

11. The timing controller of claim 8, wherein the first OCP detection circuit comprises:
    a set of first comparators, arranged to compare a set of monitored voltages with a set of first voltage thresholds to generate a set of first comparison results, respectively; and
    a first logic gate, coupled to the set of first comparators, arranged to perform a logic operation according to the set of first comparison results to generate the first OCP detection result, wherein the first OCP detection result indicates whether any of the set of monitored voltages reaches a corresponding voltage threshold within the set of first voltage thresholds.

12. The timing controller of claim 11, wherein the first OCP detection result further indicates whether a current associated with said any of the set of monitored voltages reaches a corresponding current threshold.

13. The timing controller of claim 11, wherein the second OCP detection circuit comprises:
    a set of second comparators, arranged to compare the set of monitored voltages with a set of second voltage thresholds to generate a set of second comparison results, respectively; and
    a second logic gate, coupled to the set of second comparators, arranged to perform a logic operation according to the set of second comparison results to generate the second OCP detection result, wherein the second OCP detection result indicates whether a monitored voltage of the set of monitored voltages reaches a corresponding voltage threshold within the set of second voltage thresholds.

14. The timing controller of claim 13, wherein the first OCP detection result further indicates whether a current associated with said any of the set of monitored voltages reaches a corresponding current threshold; and the second OCP detection result further indicates whether a current associated with the monitored voltage of the set of monitored voltages reaches another current threshold.

* * * * *